March 12, 1963     L. VADAS     3,080,901
PIT GRIPPERS FOR PEACH PITTER
Filed Oct. 17, 1960     3 Sheets-Sheet 1
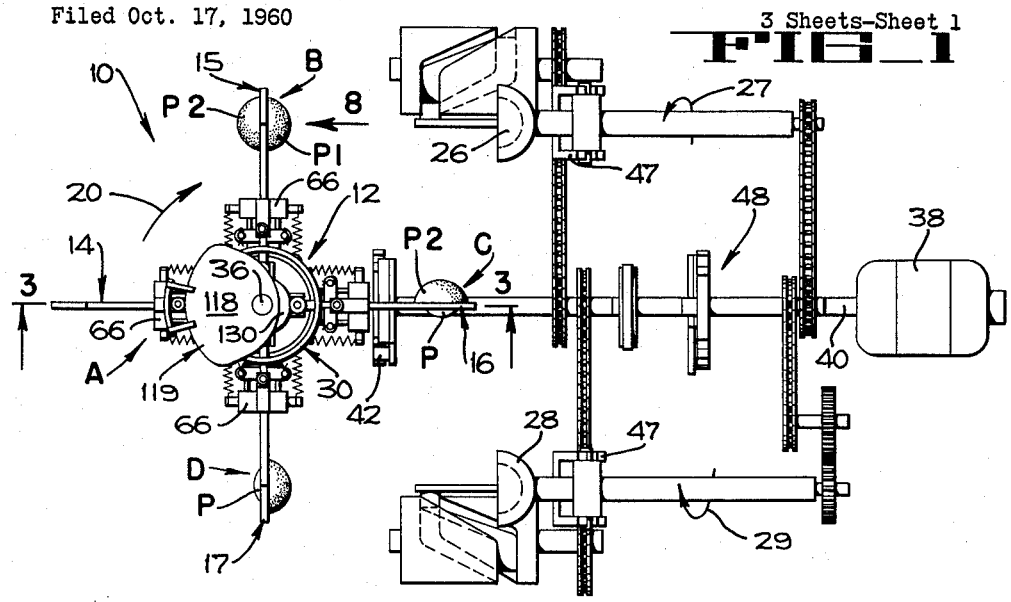
FIG_1
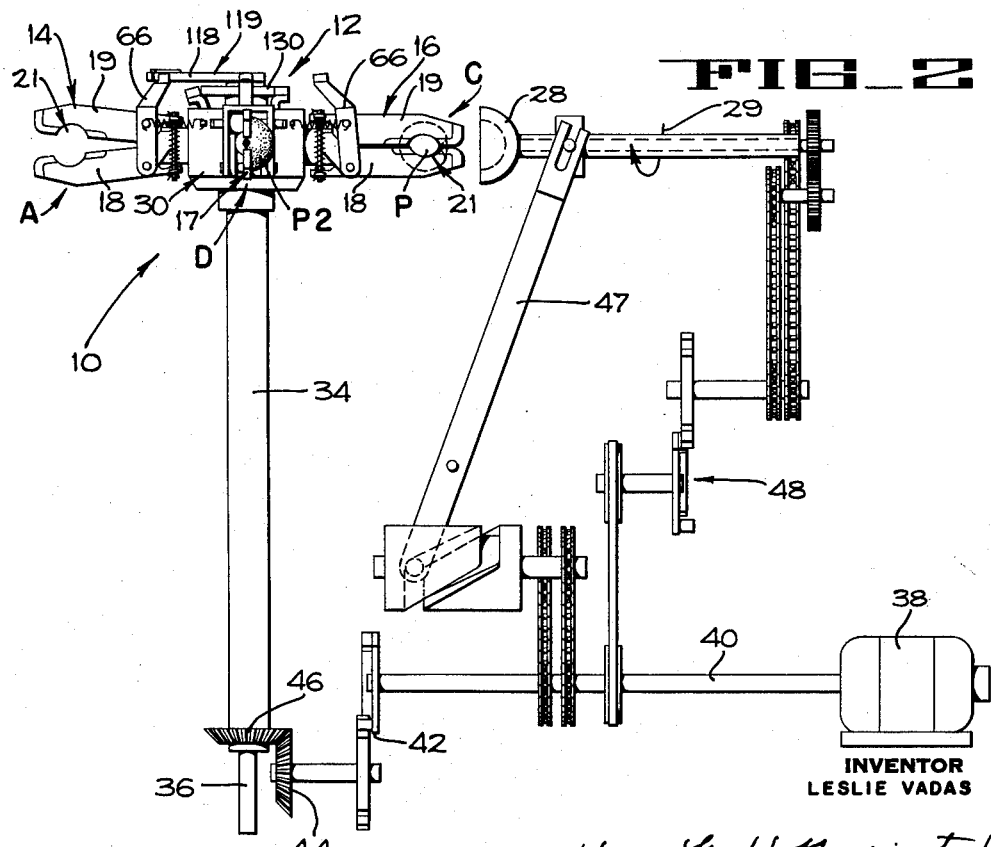
FIG_2
INVENTOR
LESLIE VADAS
BY *Hans G. Hoffmeister*
ATTORNEY

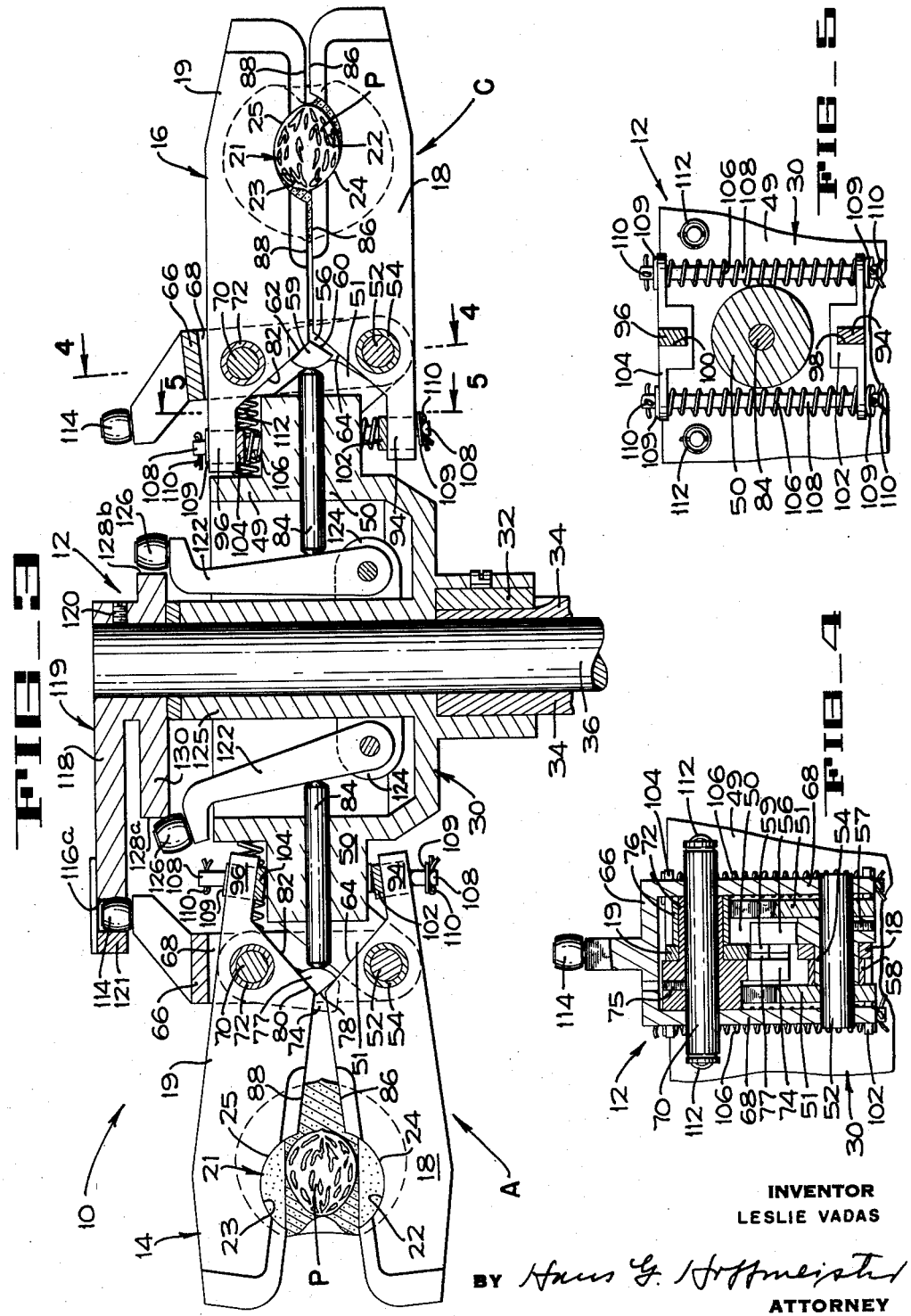

March 12, 1963     L. VADAS     3,080,901
PIT GRIPPERS FOR PEACH PITTER
Filed Oct. 17, 1960     3 Sheets-Sheet 3
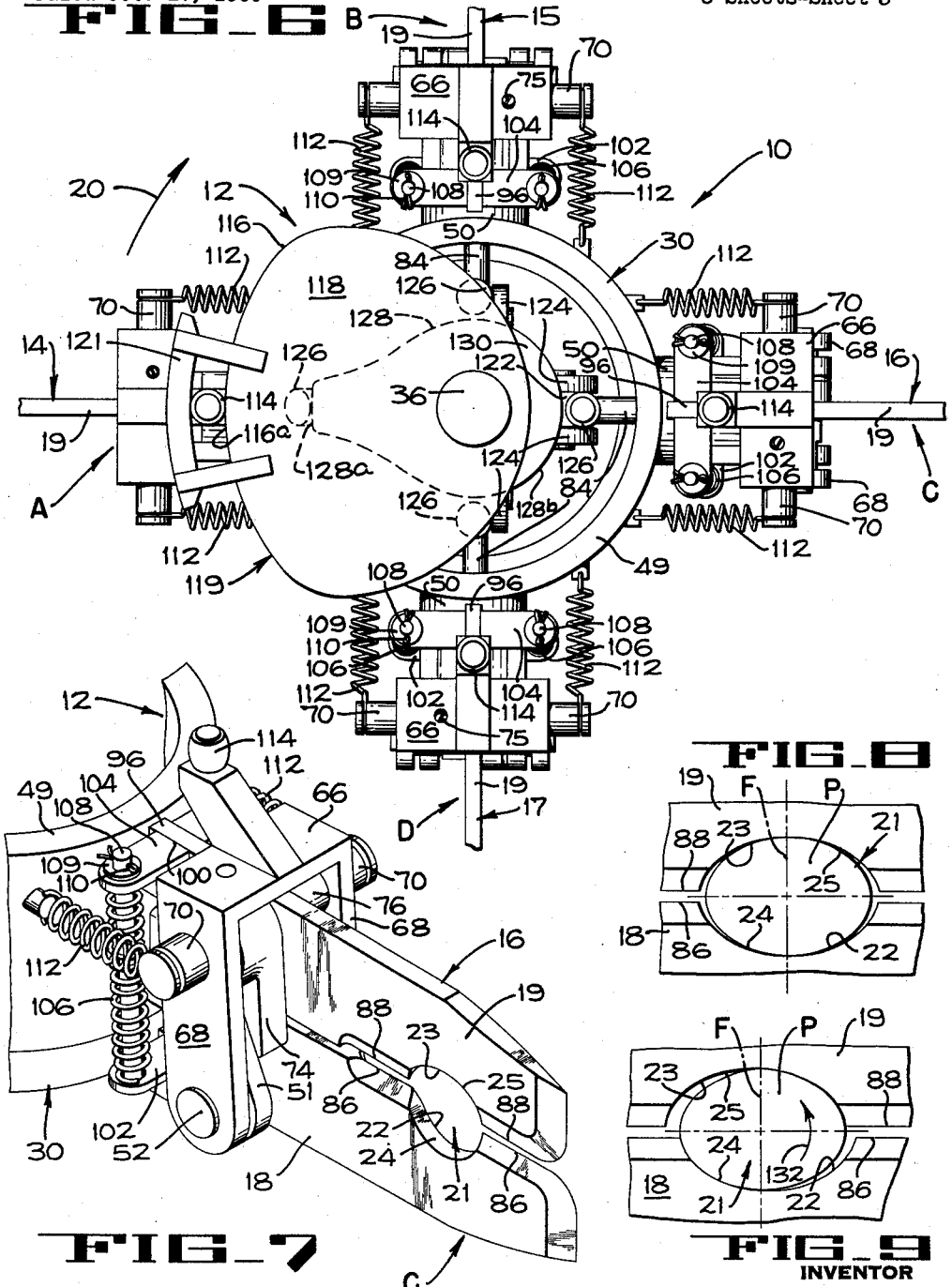
INVENTOR
LESLIE VADAS
BY *Hans G. Hoffmeister*
ATTORNEY

United States Patent Office 3,080,901
Patented Mar. 12, 1963

3,080,901
PIT GRIPPERS FOR PEACH PITTER
Leslie Vadas, Los Gatos, Calif., assignor to FMC Corporation, a corporation of Delaware
Filed Oct. 17, 1960, Ser. No. 63,077
13 Claims. (Cl. 146—28)

The present invention appertains to fruit processing machines and relates more particularly to a peach pitting machine and to apparatus therein for gripping the pits of peaches during the pitting operation.

In order to pit cling-stone peaches by one known twist-pitting method, apparatus is provided having opposite peach-bisecting and pit-gripping blades which are in coplanar alignment and have cooperating, arcuate recesses in their adjacent edges. In using such an apparatus and preceding the actual pitting operation, a peach is oriented with its suture plane in alignment with the blades and is fed between the opposite blades which are in spaced apart or open position. The blades are then moved toward each other into closed position to bisect the flesh of the peach and to receive the pit in the cooperating recesses which provide a generally elliptical pit-receiving opening of predetermined length. It is the purpose of the blade portions defining the pit-receiving opening to engage and retain the pit against turning. While the pit is held in this manner first one half of the peach and then the other half is twisted about an axis extending at right angles to the plane of the pit gripping blades to thereby free the peach halves from the pit.

It will be recognized that even though peaches have been graded so as to be of the same general size, their pits vary slightly in both diameter and length. For this reason, it is impossible to perform a uniform gripping action on the pits of such peaches by means of a pair of gripping blades which provide a pit-receiving opening that is capable of adjusting to the different diameters of the pits but cannot adjust to their different lengths. If a pit is somewhat shorter than the length of such a pit-receiving opening, the end portions of the pit are not supported and the pit is apt to turn to some extent in the opening as each fruit half is twisted during the pitting operation. Of course, when the pit is permitted to turn, the peach halves are incompletely or improperly separated from the pit.

The turning pit may strike the blade portions defining the pit-receiving opening with sufficient force to produce pit splinters or to actually split or shatter the pit. Even though the pit operation is not impaired as a result of the splintering, the splinters frequently remain clinging to the pit socket of the otherwise fully pitted peach halves. If the pit should split along its suture plane during the initial part of the piting operation, the pit, in all probability, will not be adequately gripped by the cooperating blades during the remainder of the pitting operation, thus permitting the pit halves to be turned with the associated peach halves. The halves of such peaches are, therefore, discharged from the pitter in an unpitted condition. If the pit is shattered as distinguished from split, the pitting operation may be completed in the normal manner but large pieces of pit are frequently left clinging to the pit socket. In any event, regardless of whether the peach halves have splinters, split pits or pieces of shattered pits clinging to their pit sockets they require costly, special handling to remove the objectionable pieces of pit before the peach halves are in a suitable condition for canning.

An object of the present invention is, therefore, to provide an improved fruit pitting machine of the character mentioned.

Another object is to provide pit gripping means which is automatically adjustable to engage pits which are not only of different diameters but which are also of different lengths.

Another object is to provide, in a peach pitting machine of the type mentioned, pit gripping means which is capable of applying suitable gripping forces to pits which vary in both diameter and length so as to prevent the pits from turning during the pitting operation.

These and other objects and advantages of the present invention will become apparent from the following description and the accompanying drawings, in which:

FIG. 1 is a plan of a twist-pitting machine embodying the present invention.

FIG. 2 is a side elevation of the machine shown in FIG. 1.

FIG. 3 is an enlarged fragmentary vertical section taken along lines 3—3 of FIG. 1.

FIG. 4 is a vertical section taken along lines 4—4 of FIG. 3.

FIG. 5 is a vertical section taken along lines 5—5 of FIG. 3.

FIG. 6 is an enlarged plan of a portion of the machine shown in FIG. 1.

FIG. 7 is a fragmentary perspective of one peach-bisecting and pit-gripping blade assembly as viewed from one side and above.

FIG. 8 is an enlarged fragmentary view of the cooperating blades of one peach-bisecting and pit-gripping blade assembly in their initial pit-engaging position, as viewed in the direction indicated by the arrow 8 in FIG. 1.

FIG. 9 is a view similar to FIG. 8 and shows the same cooperating blades in their pit-gripping position.

The pitting machine 10 (FIGS. 1, 2 and 6) comprises a rotatable turret or carrier 12 having four peach-bisecting and pit-gripping blade assemblies 14, 15, 16 and 17 projecting radially outward therefrom at 90° intervals. Each blade assembly 14, 15, 16 and 17 has a lower and an upper peach-bisecting and pit-gripping blade 18 and 19, respectively in coplanar relation.

The turret 12 is intermittently rotated in a clockwise direction (FIG. 1), indicated by the arrow 20, in 90° increments to successively index each of the blade assemblies 14, 15, 16 and 17 to each of four stations A, B, C and D. As a peach, previously fed to the open blades 18 and 19 (FIGS. 2 and 3) of each blade assembly while indexed at the station A, is carried by the turret 12 toward the first pitting station B, the blades 18 and 19 are closed in a scissor-like action to bisect the flesh of the peach. The pit of the peach is received in a pit-receiving opening 21 provided by cooperating recesses 22 and 23 in the associated blades 18 and 19, respectively. The walls or surfaces 24 and 25 of these recesses engage the pit and perform a first pit-gripping action. Thereafter, the upper blade 19 is shifted endways so that the surfaces 24 and 25 of the recesses cooperate to perform a second pit-gripping action. At the station B the peach half P1, located at one side of the cooperating blades 18 and 19, is engaged by a twisting head 26 which turns in the direction indicated by the arrow 27 about an axis normal to the plane of the blades, and is twisted free from the pit. The remaining half P2 of the peach, still attached to the pit gripped by the blades is, thereafter, advanced by the turret to an idler station C and then to the second pitting station D. This peach half is engaged at station D by a twisting head 28 which is operated in a manner similar to that of the twisting head 26 but is rotated in the opposite direction, indicated by the arrow 29. Accordingly, by means of the heads 26 and 28, the halves are twisted free from the pit. After each blade assembly concerned leaves station D and before it again arrives at station A, the associated blade 19 is shifted endways back to its original position. The two blades 18 and 19 are then opened so as to release the pit in order to discharge it from the machine 10 preparatory to receiving another peach for a subsequent pitting operation.

The turret 12 comprises a central body 30 (FIG. 3) secured by a key 32 to the upper end of a tubular drive shaft 34 for rotation therewith. The drive shaft 34 is journaled upon a stationary rod 36 and is intermittently driven by a motor 38 (FIGS. 1 and 2) through a drive shaft 40, a Geneva drive 42 and bevel gears 44 and 46 (FIG. 2). Upon operation of the motor 38, the drive shaft 40 is continuously rotated and the turret 12 is advanced in 90° increments to index the blade assemblies 14, 15, 16 and 17 successively at stations A, B, C, and D.

When the blade assemblies are in indexed position the twisting heads 26 and 28 are each projected by a cam actuated lever 47 into engagement with the peach halves at the stations B and D, respectively. While the heads 26 and 28 are in their projected positions they are rotated by an intermittent drive 48 to free the peach halves from the pits. Thereafter, the rotation of the twister heads stops and the heads are retracted to the positions shown in FIGS. 1 and 2 preparatory to indexing of the turret 12. If a more detailed understanding is desired of the manner in which the pitting heads 26 and 28 operate, reference may be had to the pending application Ser. No. 792,210 of James M. Hait for Method of and Apparatus for Processing Fruit, which is assigned to the assignee of the present application.

As understood from FIGS. 3 and 6, the body 30 of the turret comprises an outer cylindrical wall 49 having four equally spaced cylindrical support members 50 (FIGS. 3 and 5) projecting radially therefrom for the purpose of mounting the blade assemblies 14, 15, 16 and 17. Since these four blade assemblies are similar to each other, the following description thereof will, in general, be directed to only one of the assemblies. It is to be understood that similar parts of all the blade assemblies shown in the several views will be identified by the use of like reference numbers.

Each cylindrical support member 50 (FIGS. 3 and 4) has two horizontally spaced wing members 51 in which a horizontal shaft 52 is journalled. The previously mentioned lower blade 18 is pivotally mounted on the cylindrical hub 54 (FIG. 4) of a blade actuator arm 56. The hub 54 of the actuator arm 56 is disposed on the shaft 52 and extends between the wing members 51. The actuator arm 56 is secured by a set screw 57 to the shaft 52 to prevent axial movement of the same. It will be apparent (FIG. 4) that a sleeve 58 on the hub 54, extending between the blade 18 and the adjacent wing member 51, holds the blade 18 against the actuator arm 56 and in fixed spaced relation with respect to the opposite wing members 51. The arm 56 (FIG. 3), projecting upward from the hub 54, has a wedge-shaped boss 59 at its upper end providing diverging faces 60 and 62. The boss 59 projects part way behind the inner end portion of the blade 18 so that the face 60 can contact an adjacent inclined edge 64 of the blade 18.

A lever 66 having a U-shaped portion (FIG. 4) providing horizontally spaced arms 68 has the lower ends of the arms journaled on the ends of the shaft 52 to mount the lever 66 for pivotal movement. A shaft 70 received in the upper parts of the arms 68 is located above the shaft 52 and is in parallel relation thereto. The upper blade 19 (FIGS. 3 and 4) is pivotally disposed on the cylindrical hub 72 of a blade actuator arm 74 mounted on the shaft 70. The hub 72 extends between the arms 68 of the lever 66 and is fixed to the shaft 70 by a set screw 75 to prevent axial displacement of the shaft 70. A sleeve 76 on the hub 72, extending between the blade 19 and the adjacent arm 68, holds the blade 19 against the actuator arm 74 and in planar alignment with the opposite blade 18 (FIGS. 4 and 7). The arm 74, projecting downward from the hub 72, has a wedge-shaped boss 77 at its lower end providing diverging faces 78 and 80. The boss 77 projects part way behind the inner end portion of the upper blade 19 so that the face 80 can contact an adjacent inclined edge 82 of the blade 19. The wedge-shaped bosses 59 and 77 (FIG. 4) are disposed in side-by-side relation in such a way that the adjacent faces 60, 78 and 62, 80 are adjacent the edges 64 and 82, respectively, of the blades 18 and 19 to contact said edges for a purpose to be made clear hereinafter. The bosses 59 and 77 are arranged to be engaged by a push rod 84 which is located substantially midway between the shafts 52 and 70 and is slidable radially of the turret 12 in the associated cylindrical support member 50. When the push rod 84 is projected outward while engaging the bosses 59 and 77, the bosses engage the inclined edges 64 and 82 of the blades 18 and 19 which are thus pivoted away from each other about their shafts 52 and 70.

The cooperating blades 18 and 19 are of similar shape and the elongate, generally rectangular portions thereof, projecting radially outward with respect to the turret from the shafts 52 and 70, have straight adjacent edges 86 and 88, respectively. The edges 86 and 88 are indented to provide the previously mentioned recesses 22 and 23, respectively, having the arcuate surfaces 24 and 25 which cooperate to provide the elliptical pit-receiving opening 21 (FIGS. 3, 8 and 9). The thickness of the blades 18 and 19 is such as to provide the arcuate surfaces 24 and 25 of the recesses 22 and 23 with a sufficient pit-engaging area to suitably support and grip the pits in a manner and for a purpose to be made clear. The edges 86 and 88 of the blades 18 and 19, when the blades are closed and in fruit-bisecting or pit-clamping position, as shown in the blade assembly 16 of FIG. 3, extend substantially parallel to the axis of the associated push rod 84. The outer ends of the blades 18 and 19 as well as the outer portions of the edges 86 and 88 are sharpened to aid in impaling and severing the peaches.

The inner end portions of the blades 18 and 19 (FIG. 3) have arms 94 and 96, respectively, which project toward the turret 12 and are slidable in slots 98 and 100 (FIG. 5) in opposite, spaced cross bars 102 and 104, respectively. Springs 106, extending between and engaging the associated outer ends of the cross bars 102 and 104 urge the same apart and consequently urge the arms 94 and 96 of the associated blades 18 and 19 away from each other about their shafts 52 and 70 to pivot the blades into closed position. A rod 108 (FIG. 5), passing through each spring 106 and through the associated ends of the cross bars 102 and 104, is provided with two washers 109. A washer 109 is located adjacent each end of the rods 108, above and below the cross bars 102 and 104, respectively, the washers being retained on the rods by cotter pins 110 therein. Outward movement of the cross bars 102 and 104 is limited by engagement of the associated washers 109 with the cotter pins 110. Movement of the blades 18 and 19 toward each other under the urgency of the springs 106 is limited in this way so as to determine the closed position of the blades. The springs 106 are sufficiently strong to force the sharpened edges 86 and 88 to sever the meat of a peach impaled on the blades 18 and 19, as will become apparent.

Since the upper blade 19 is carried by the pivotal lever 66, this blade can be moved lengthwise, radially of the turret, upon pivotal movement of the lever 66. The lever 66, and consequently the blade 19 are urged toward the turret 12 by two springs 112 (FIGS. 6 and 7) which are connected to and stretched between the outer wall 49 of the turret and the ends, respectively, of the shaft 70.

The upper end of the lever 66 is provided with a cam follower roller 114 which rides along the outer peripheral surface 116 of a disc cam 118 that is part of a control cam assembly 119 (FIG. 6) mounted upon the upper end of the stationary rod 36 and which is secured thereto by means such as a set screw 120 (FIG. 3). As shown best in FIGS. 1, 3 and 6 the cam 118 is so designed that the lever 66 is held in its outermost position against the urgency of the springs 112 by a rise 116a when the associated blade assembly is at the feed station A. A retaining rail 121 secured to the cam 118 in the region of station A (FIGS. 3 and 6) cooperates with the surface 116a and prevents possible outward movement of the lever 66 beyond the position thereof shown at station A (FIG. 3). As a result, the upper blade 19 of a blade assembly when indexed at station A, is in its outermost position with the arcuate recess 23 thereof opposite the arcuate recess 22 of the associated lower blade 18.

As best understood from FIGS. 3 and 6 each blade assembly 14, 15, 16 and 17 is provided with a lever 122 pivoted in spaced ears 124, on an inner cylindrical wall 125 of the turret 12. A cam follower roller 126 on the upper end of each lever 122 rides along the outer peripheral surface 128 of another disc cam 130 of the control cam assembly 119. The cam 130 has a single rise 128a arranged to hold the lever 122 of the blade assembly associated therewith in its outermost position while engaging the push rod 84 when the blade assembly is at the station A (FIG. 3). For this reason the associated push rod 84 is in its outwardly projected position and is in engagement with the pads 59 and 77 of the two actuator arms 56 and 74. Thus, the diverging faces 60, 62 and 78, 80 of the pads 59 and 77 engage the inclined edges 64 and 82 of the blades 18 and 19 and hold the blades in their open, peach-receiving position against the urgency of the springs 106 associated therewith. When the blades are in the open position (FIG. 3) the sharpened portions of the edges 86 and 88 are spaced sufficiently far apart for the pit P of a peach, impaled on the blades 18 and 19, to be moved easily therebetween into a position intermediate the recesses 22 and 23. It will be noted (FIG. 3) that when the blades 18 and 19 are open the arcuate edges 24 and 25 of the associated recesses 22 and 23 lie in a common circle. Thus, it will be apparent that when the blades are closed in peach-bisecting and pit-gripping position, the arcuate recesses 22 and 23 provide the generally elliptical pit-receiving opening 21 having its major axis substantially coincident with the axis of the push rod 84.

A peach (FIGS. 3, 8 and 9) to be impaled on the blades of one of the assemblies 14, 15, 16 or 17 at station A is first positioned with its suture plane in planar alignment with the blades 18 and 19 and with its stemblossom axis coaxial with the push rod 84. The peach is moved radially inward of the turret until the pit P is intermediate the recesses 22 and 23. The sharpened edges 86 and 88 of the blades cut into the peach at opposite sides as it is fed onto the blades. It is to be understood that an individual peach is fed in any convenient manner such as by a machine (not shown) to the open blades 18 and 19 of each of the blade assemblies 14, 15, 16 and 17 during the time each assembly is in indexed position at the feed station A. The peaches, which are to be pitted in the machine 10, are carefully graded for uniformity of size so that, whereas, the pits may vary in diameter and length these variations are slight, usually within one eighth to one quarter of an inch.

When the pitting machine 10 is in operation and one of the blade assemblies 14, 15, 16 and 17 is in indexed position at the feed station A, the follower roller 114 of the associated lever 66 engages the rise 116a of the cam 118. Thus, the upper blade 19 of the blade assembly concerned is held in the position shown in FIG. 3 with the arcuate recess 23 opposite the recess 22 of the associated lower blade 18. The blades 18 and 19 are in open, peach-receiving position since the follower roller 126 of the associated lever 122 is in engagement with the rise 128a of the cam 130. During the time the blade assembly is in indexed position at station A a peach is impaled upon the blades. Upon movement of the turret 12 in the direction indicated by the arrow 20 (FIGS. 1 and 6) the peach thus impaled is advanced from the feed station A toward the twister head 26 at the first pitting station B. During this movement of the turret, the follower roller 126 rides off the rise 128a (FIG. 6) of the cam 130 thereby releasing the blades 18 and 19 for movement to closed position (FIGS. 3 and 8) as a result of the action of the springs 106. The cooperating blades 18 and 19, as they close, sever the flesh of the peach and the arcuate surfaces 24 and 25 of the recesses 22 and 23 contact the pit P (FIG. 8) in the region of its minor axis F. If no peach has been fed to the blades or if a peach having a very small pit has been impaled on the blades, the edges 86 and 88 of the blades are prevented from touching and damaging each other. This is accomplished by the washers 109 in the manner previously described.

Since the surfaces 60, 78 and 62, 80 of the pads 59 and 77 of the blade actuator arms 56 and 74 are held in engagement with the inclined surfaces 64 and 82 by the projected push rod 84 during movement of the blades 18 and 19 into open position, it will be understood that the associated push rod 84 is moved inwardly of the turret 12 by the blades, as they close. The push rod 84 is of such length, however, that the follower roller 126 of the associated lever 122 does not engage the low dwell 128b of the cam 130 when the blades 18 and 19 are fully closed as determined by the washers 109 in the manner described. When the blades engage the pit P in performing their first gripping action, the blades 18 and 19 are not fully closed and the actuator arms 56 and 74 are free to pivot further inward to a limited extent. This condition is best understood by reference to the blade assembly 16 in FIG. 3 wherein the inclined surface 64 of the blade 18 is spaced from the face 60 of the boss 59.

When the blade assembly has traveled further toward station B from station A (FIG. 6) the follower roller 114 of the lever 66 rides off the rise 116a of the cam 118. The lever 66 is thereupon pivoted inwardly of the turret 12 under the urgency of the springs 112 and moves or shifts the upper blade 19 endways, inwardly of the turret. If no pit is in the opening 21 provide by the associated recesses 22 and 23, the blade 19 will be shifted inward of the turret 12 until the cam follower 126 of the lever 122 engages the low dwell 128b of the cam 130 (FIG. 3) as the associated actuator arm 74 forces the push rod 84 inward. With the pit P in the pit-receiving opening 21 (FIGS. 3 and 9), shifting of the blade 19 in the manner described brings that portion of the arcuate surface 25 at the outer end of the recess 23 against the pit P throughout substantially the entire upper right hand quadrant (FIG. 9) of the opening 21. The pit P is thereby shifted inward of the turret 12 in the pit-receiving opening 21. Thus, the opposite portion of the pit P (FIG. 9) is brought into engagement with the arcuate surface 24 toward the inner end of the recess 22 throughout substantially the entire lower left hand quadrant of the opening 21. Therefore, with the pit P in the pit-receiving opening 21 (FIGS. 3 and 9) the distance that the blade 19 can shift inward of the turret 12 is limited by the pit. For this reason, the cam follower 126 of the lever 122 is not moved against the low dwell 128b and the blades 18 and 19 under the urgency of the springs 112 cooperate to apply second, opposed gripping forces to the pit lengthwise thereof. In this way, the pit-receiving opening 21 is automatically adjusted to contact the end portions of pits having different lengths. From the foregoing description it is apparent that yieldable gripping forces provided by the two sets of springs 106 and 112 are applied to the pit P by the opposed arcuate surfaces 24 and 25 of the blades 18 and 19 during the entire pitting operation. Thus, the pit P is firmly gripped by the arcuate surfaces 24 and 25 and is held against any unwarranted turning movement in the direction indicated by the arrow 132 (FIG. 9) resulting from the action of the twisting heads 26 and 28 during the pitting operation performed thereby at the stations B and D. By rotating the pitting heads 26 and 28 in the directions indicated by the arrows 27 and 29, respectively, turning forces are always applied to the pits in the direction indicated by the arrow 132 (FIG. 9). For this reason, the same quadrants of the recesses' arcuate surfaces 24 and 25 resist rotation of the pits even though the pitting heads 26 and 28, respectively, engage the peach halves at first one side of the blades and then at the other.

After completing the pitting operation of a peach and upon rotary movement of the turret 12 to return the blade assembly to the feed station A from the second or last pitting station D, the follower roller 114 of the lever 66 rides onto the rise 116a of the cam 118. The upper blade 19 and its recess 23 are thus shifted radially outward of the turret 12 so that the recesses 22 and 23 are opposite each other (FIG. 8), thus releasing the forces applied to the pit P longitudinally thereof by the springs 112. Adjacent the station A, the follower roller 126 rides onto the rise 128a of the cam 130 whereupon the lever 122 is pivoted outwardly of the turret. Outward movement of the lever 122 moves the push rod 84 outward into engagement with bosses 59 and 77 of the actuator arms 56 and 74. The faces 60, 78 and 62, 80 thereupon engage the inclined surfaces 64 and 82 of the blades 18 and 19 and move the same into open, peach-receiving position against the urgency of the springs 106. As the blades open, the pit P is completely released and drops into a pit receptacle, not shown. The blade assembly concerned is subsequently indexed at the feed station A to receive another peach preparatory to clamping the pit in the manner described for the following pitting operation.

It will be apparent from the previous description that the apparatus of the present invention is automatically adjustable to uniformly grip the pits of peaches whose pits are of different diameters as well as of different lengths during the performance of the twist-pitting operation in the machine 10.

While a particular embodiment of the present invention has been shown and described it will be understood that the apparatus of the present invention is capable of modification and variation without departing from the principles of the invention and that the scope of the invention should be limited only by the scope and proper interpretation of the claims appended hereto.

The invention having thus been described, what is believed to be new and desired to be protected by Letters Patent is:

1. In a fruit processing apparatus, opposite movably mounted blades each having an elongate edge indented to define a recess, means urging one blade toward the other in a common plane to bring said edges into fruit-bisecting relation, said recesses providing a pit-receiving opening for the pit of a fruit bisected by said blades, the edges of the blades defining said recesses being adapted to engage the pit of the fruit bisected by the blades and apply first opposed gripping forces in said plane to the pit, and timing means operatively connected to said blades for controlling said blades to first enable said one blade to be urged toward said other blade into fruit bisecting relation therewith and thereafter to effect relative lengthwise movement between said blades to offset said recesses to apply second opposed gripping forces to the fruit pit.

2. In a fruit processing apparatus, opposite movably mounted blades each having an elongate edge indented to define a recess, means urging one blade toward the other to bring said edges into fruit-bisecting relation, said recesses providing a pit-receiving opening for the pit of a fruit bisected by said blades, the edges defining the recesses being adapted to engage the pit of the fruit bisected by the blades to apply first opposed gripping forces to the pit, timing means operatively connected to said blades for controlling said blades to first enable said one blade to be urged toward said other blade into fruit bisecting relation therewith and thereafter to effect relative lengthwise movement between said blades to offset said recesses to apply second opposed gripping forces to the fruit pit, and means connected to one of said blades and arranged to move the same away from the other to dispose said blades in spaced fruit-receiving position.

3. In a fruit processing machine, a pair of blades each having an elongate edge indented to define a recess, said edges being adjacent each other in cooperative relation, means connected to one blade to move the same edgewise toward the other with the recesses opposite each other defining a pit-receiving opening for the pit of a fruit located between said blades and to bisect the meat of the fruit, the edges of the blades defining the recesses being arranged to apply first gripping forces at substantially opposite locations to the pit in said pit-receiving opening when said one blade is moved toward said other blade into meat-bisecting relation therewith, and means for shifting said one blade lengthwise when said blades are in meat-bisecting relation to offset the recess thereof with respect to the recess in said other blade, the edges of said blades defining said recesses being adapted to apply second gripping forces to said pit at other substantially opposite locations when said one blade is shifted.

4. In a fruit processing apparatus, means defining opposite elongate recesses, said recess defining means being mounted for movement into engagement with the pit of a fruit, means urging one of said recess defining means toward the other to bring said recesses adjacent each other in a pit gripping plane to provide a pit-receiving opening for the pit of a fruit and to engage the pit therein to apply first opposed gripping forces to the pit in said plane, means operably associated with said opposite recess defining means for effecting relative movement therebetween lengthwise of said recesses for applying second opposed gripping forces to the pit of the fruit in said pit-receiving opening, and fruit engaging means movable into engagement with the fruit whose pit is gripped and rotatable to twist the meat of the fruit free from the gripped pit.

5. In a fruit processing apparatus, means defining opposite elongate recesses, said recess defining means being mounted for movement into engagement with the pit of a fruit, means urging one of said recess defining means toward the other to bring said recesses adjacent each other in a pit gripping plane to provide a pit-receiving opening for the pit of a fruit and to engage the pit therein to apply first opposed gripping forces to the pit in said plane, means operably associated with said opposite recess defining means for effecting relative movement therebetween lengthwise of said recesses for applying second opposed gripping forces to the pit of the fruit in said pit-receiving opening, first fruit engaging means movable into engagement with one side of the fruit whose pit is gripped and rotatable to twist part of the meat of the fruit free from the gripped pit, and second fruit engaging means movable into engagement with the other side of the fruit whose pit is gripped and rotatable to twist another part of the meat of the fruit free from the gripped pit.

6. In a fruit processing apparatus, a pair of flat members having elongate recesses, said members being mounted for movement into engagement with the pit of a fruit, means urging one of said members toward the other to bring said recesses adjacent each other in planar alignment to provide a pit-receiving opening for the pit of a fruit and to engage the pit therein to apply first opposed gripping forces to the pit in the plane of said members, and means operably associated with said recess defining means for effecting relative movement therebetween lengthwise of said recesses for applying second opposed gripping forces to the pit of a fruit in said pit receiving opening.

7. A fruit processing machine comprising a pair of fruit bisecting blades each having an elongate edge defining a rounded recess, means mounting one blade for edgewise movement toward said other blade so that the edges are in fruit bisecting relation and the edges of the blades defining the recesses provide a pit-receiving opening, means operably connected to said one blade to move the same toward the other blade, said blade moving means acting through said one blade to apply forces at first spaced locations to a pit in said pit-receiving opening when said blades are in fruit-bisecting relation, means for moving said one blade away from said other blade into spaced fruit-receiving relation therewith, means mounting one blade for lengthwise shifting movement, and means for shifting said shiftably mounted blade when said blades are in fruit-bisecting relation to offset the recess of said shiftably mounted blade with respect to the recess in the other blade to engage the pit and apply forces to the pit at other spaced locations spaced from said first locations for effectively gripping the pit.

8. In a fruit processing apparatus, first and second blades each having a elongate edge defining a recess, means mounting said blades with said recessed edges in cooperative relation and for coplanar movement toward and away from each other, means operably associated with said blades to move the same between a first position wherein said blades are spaced from each other to receive a fruit therebetween and a second position wherein the recessed edges of said blades are in fruit bisecting relation and the edges of said blades defining the recesses cooperate to provide a pit-receiving opening, means mounting one blade for lengthwise movement, resilient means connected to said one blade to urge the same lengthwise in one direction, retaining means associated with said one blade to releasably hold the same against the urgency of said resilient means with the recess of said one blade opposite the recess of the other blade when the blades are in fruit-receiving position, and means operably associated with said retaining means to release said retaining means when said blades are in fruit bisecting relation for said resilient means to move said one blade lengthwise to offset the recess thereof with respect to the recess of said other blade for the edges of the blades defining the recesses to resiliently grip a pit in said pit-receiving opening.

9. A fruit processing apparatus having in combination, first and second elongate blades each having an edge defining a recess, means movably mounting said blades in coplanar relation for movement of said recessed edges toward and away from each other, resilient means urging said blades toward each other into fruit-bisecting relation wherein the blade edges defining the recesses are opposite each other and provide an opening to receiving the pit of a fruit bisected by said blades and apply first gripping forces to the pit, means for releasably retaining said blades in a position away from each other against the urgency of said resilient means and in a position to receive a fruit therebetween, means mounting one of said blades for lengthwise movement, means urging said one blade lengthwise in one direction to move the recess thereof out of position opposite the recess of the other blade to apply second gripping forces to the pit, and means operably connected to said one blade for releasably retaining the same against lengthwise movement in said one direction with said recesses opposite each other.

10. In a peach pitting machine, a support structure, a first blade mounted on said support for edgewise pivotal movement about a first axis and having an elongate edge defining a recess, a lever mounted for pivotal movement about said first axis, a second blade mounted on said lever for edgewise pivotal movement about a second axis spaced from said first axis and having an elongate edge defining a recess, said elongate edges of said blades being arranged in cooperative relation to bisect a peach, first resilient means connected to said first and said second blades and urging the same toward each other about said first and said second axes, respectively, to move said elongate edges into peach-bisecting relation, blade opening means operatively associated with said first and said second blades to pivot the same about said first and said second axes, respectively from peach-bisecting relation into peach-receiving position, second resilient means urging said lever to pivot about said first axis to shift said second blade lengthwise, and control means engageable with both said lever and said blade opening means to initially retain said blades in peach-receiving position and thereafter to first release said blade opening means for movement of said blades into peach-bisecting relation with said recesses opposite each other wherein the blade edges defining the recesses provide a pit-receiving opening and perform a first gripping action on a pit therein and to then release said lever to shift said second blade to thereby offset said recesses for the blade edges defining the recesses to perform a second gripping action on the pit.

11. In a fruit processing apparatus, opposite movably mounted fruit bisecting blades each having an elongate edge indented to define a recess, said recesses cooperating to provide a pit receiving opening for the pit of a fruit bisected by said blades, the edges of said blades defining said recesses being movable toward each other to engage the pit of the fruit bisected by the blades and apply first opposed gripping forces to the pit, and blade actuating means operatively connected to said blades to effect relative movement between said blades toward each other into fruit bisecting relation and thereafter to effect relative lengthwise movement between said blades to offset said recesses and apply second opposed gripping forces to the fruit pit.

12. In a fruit processing apparatus of the type wherein a pair of coplanar blades having opposed recesses are moved in a first direction toward each to a closed position to cause the blades to bisect a fruit and to cause the opposed recesses of the blades to receive the pit of the fruit, each recess being defined by an arcuate gripping surface including two end surfaces and a central surface which grips the pit when said blades are in closed position, and means operatively connected to said blades for effecting relative movement between said blades in a direction substantially at right angles to said first direction to move end wall portions of said arcuate gripping surfaces into gripping engagement with the pit while said blades are in said closed position.

13. In a fruit processing apparatus, a pair of elongate blades each having an elongate edge indented to define a recess, means mounting said blades for movement toward each other in a direction generally transverse to their length to a blade-closing position and mounting one of said blades for longitudinal movement relative to the other blade, first actuating means for moving said blades in said transverse direction to said blade-closing position to bring said edges into fruit-bisecting position, said recesses providing a pit-receiving opening for the pit of a fruit bisected by said blades, the edges of said blades defining said recesses being adapted to engage the pit of the fruit bisected by said blades and apply first opposed gripping forces to the pit, second actuating means connected to said blade mounting means for moving one of said blades in said longitudinal direction, and timing means connected to said first and second actuating means for effecting said longitudinal movement of said one blade after said blades have been moved to said closed position.

References Cited in the file of this patent

UNITED STATES PATENTS

| 921,523 | Dunkley | May 11, 1909 |
| 2,826,228 | Perrelli et al. | Mar. 11, 1958 |
| 3,035,620 | Drake et al. | May 22, 1962 |